(No Model.) 5 Sheets—Sheet 2.
C. B. WITHINGTON.
MAGAZINE CAMERA.
No. 538,806. Patented May 7, 1895.
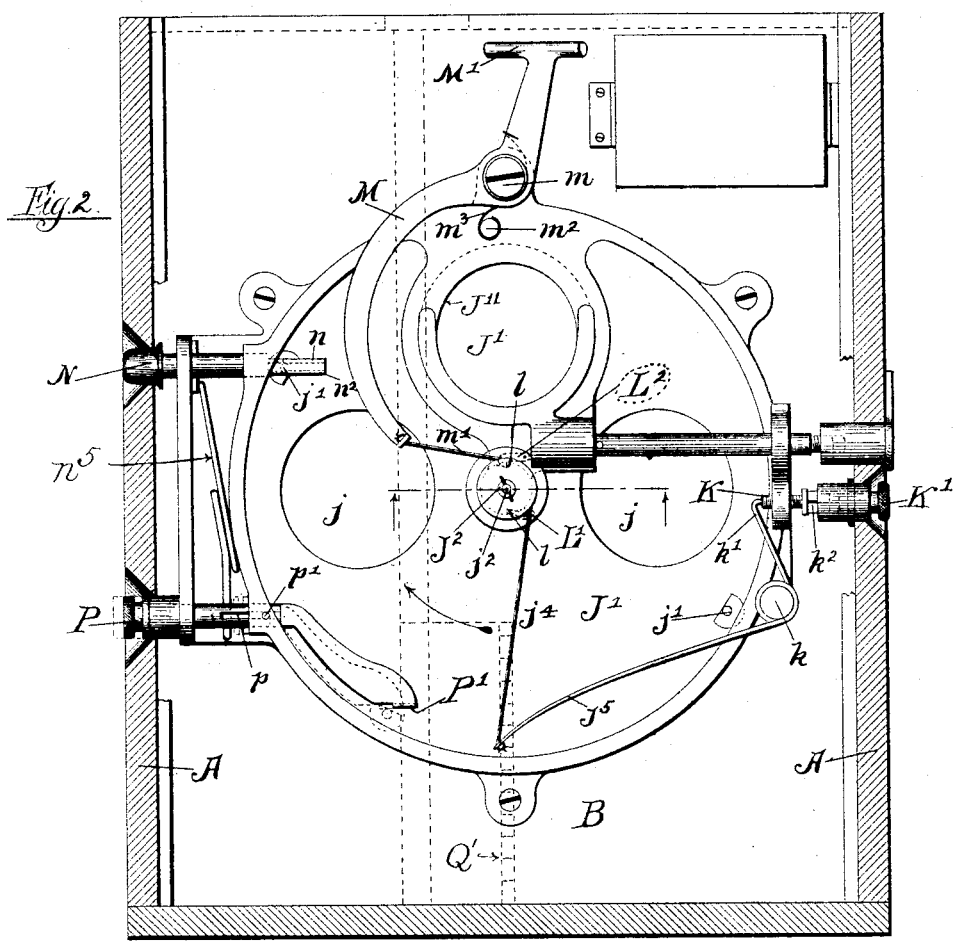
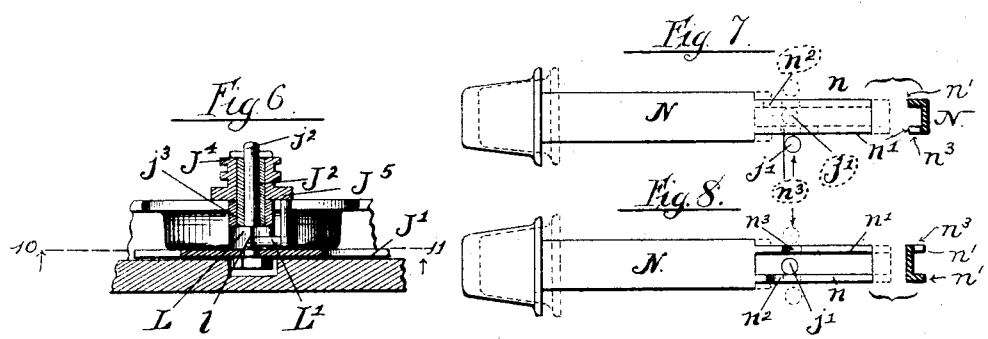

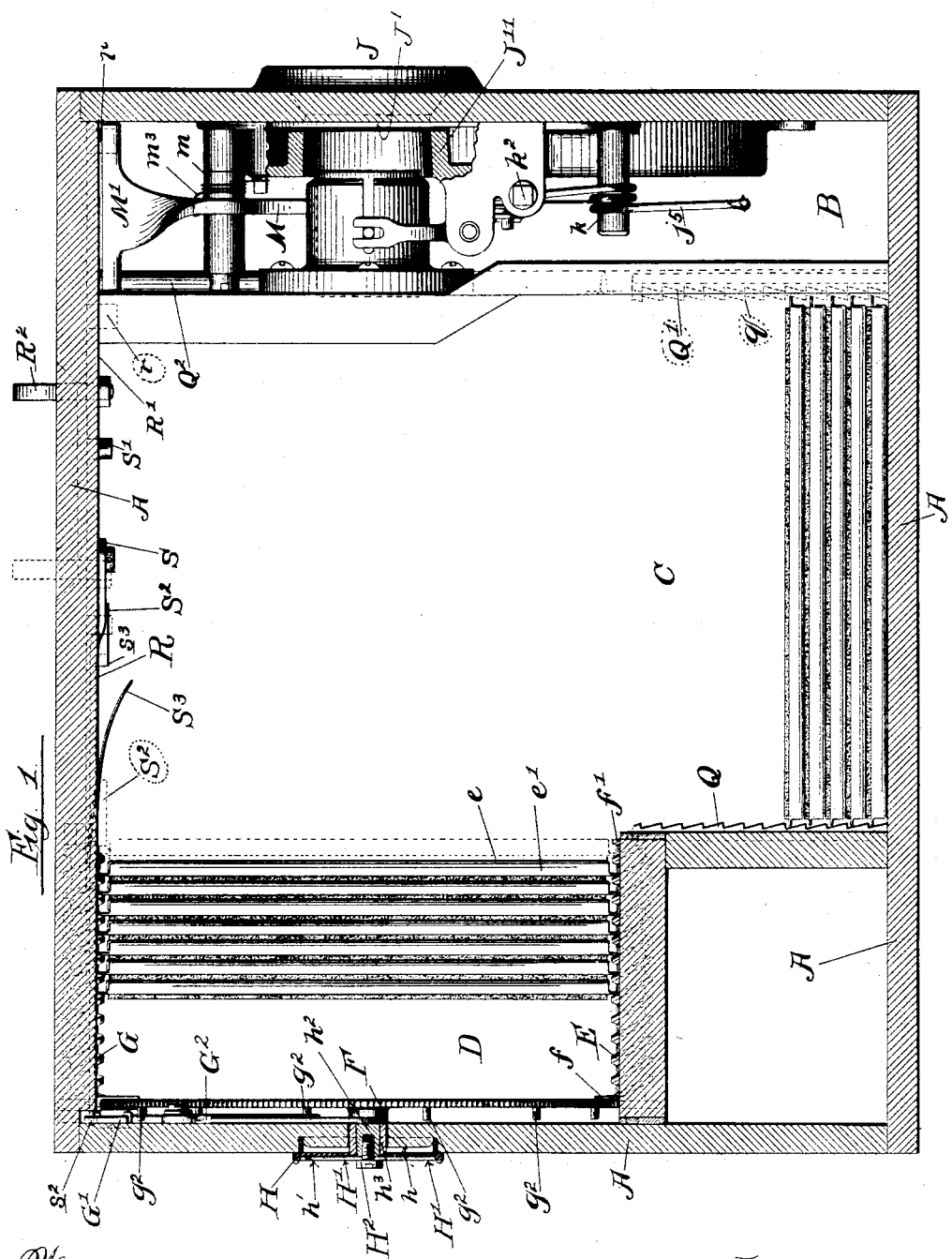

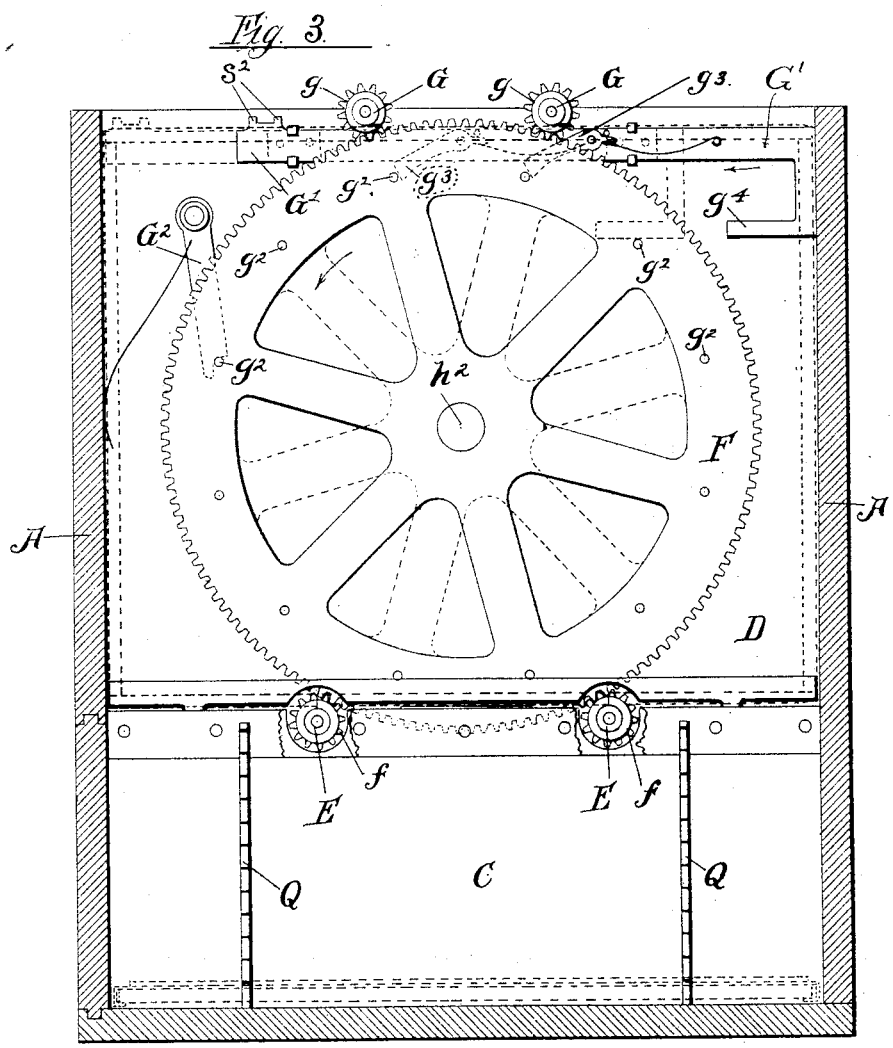

(No Model.)  C. B. WITHINGTON.  5 Sheets—Sheet 4.
MAGAZINE CAMERA.
No. 538,806.  Patented May 7, 1895.
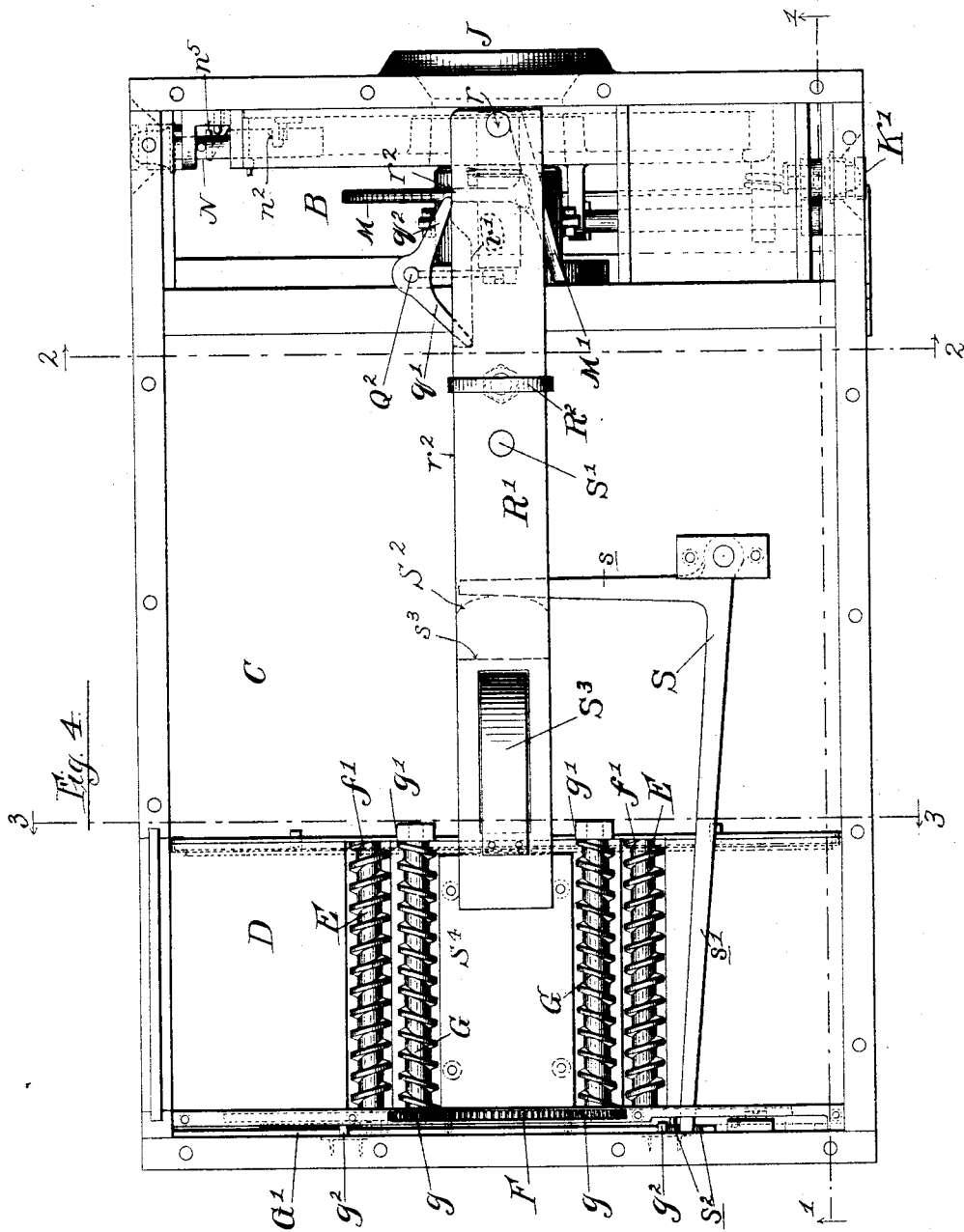

(No Model.) 5 Sheets—Sheet 5.
C. B. WITHINGTON.
MAGAZINE CAMERA.
No. 538,806. Patented May 7, 1895.
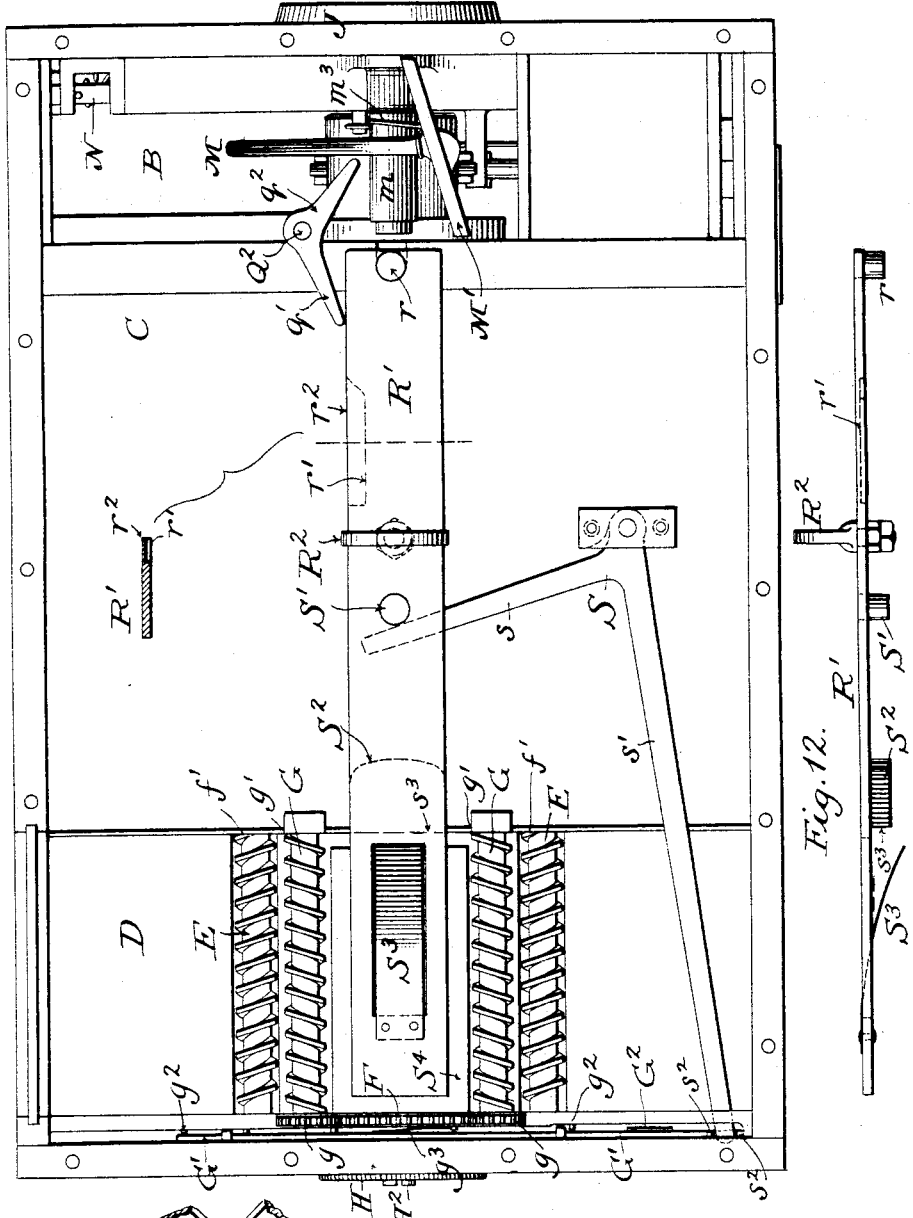
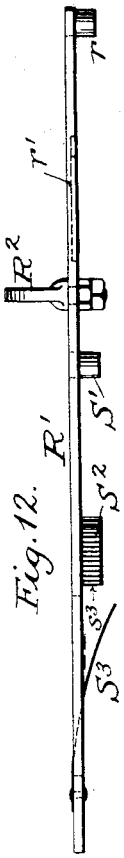
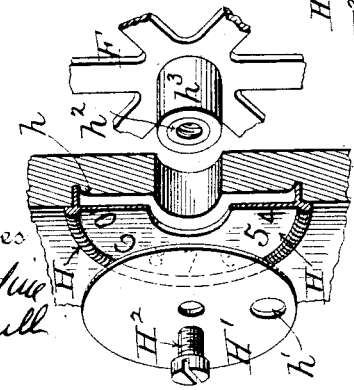
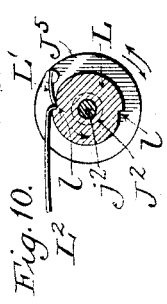
Witnesses
Inventor,
C. B. Withington,
by Dodge Son
Attorneys.

UNITED STATES PATENT OFFICE.

CHARLES B. WITHINGTON, OF JANESVILLE, WISCONSIN, ASSIGNOR OF ONE-HALF TO GEORGE W. WISE, OF SAME PLACE.

MAGAZINE-CAMERA.

SPECIFICATION forming part of Letters Patent No. 538,806, dated May 7, 1895.

Application filed March 20, 1894. Serial No. 504,391. (No model.)

*To all whom it may concern:*

Be it known that I, CHARLES B. WITHINGTON, a citizen of the United States, residing at Janesville, in the county of Rock and State of Wisconsin, have invented certain new and useful Improvements in Photographic Cameras, of which the following is a specification.

In Letters Patent of the United States granted to me on the 18th day of July, 1893, No. 501,703, I have described a camera in which a set of sensitive plates are contained in one compartment and fed one by one after exposure, to another compartment where they are held out of the way of the rays of light, each succeeding sensitive, unexposed plate being carried forward a step into the focus previously occupied by the exposed plate just transferred.

My present invention relates mainly to improvements in cameras of this type and it consists in novel mechanism for feeding forward the sensitive plates to focus and delivering the exposed plates to their appropriate compartment; in combining with the sensitive-plate or exposure compartment a worm-shaft or shafts in its floor, a worm-shaft or shafts overhead, said worms having their threads of such pitch as to embrace between them, in proper order, prepared or sensitive-plates with their holders or separating diaphragms, a gear-wheel engaging with pinions on said worms to rotate them and means for intermittently rotating said gear-wheel, the relation of the worms beneath and overhead being such that as the exposed plate is delivered from the sensitive-plate compartment, its lower edge shall be still engaged with the extreme end of the thread of the worm or worms in the flooring of said compartment, and its upper edge out of engagement with the overhead worm or worms; in combining with the gear-wheel whereby the worms which feed the sensitive plates are operated, an intermittently operating driving pawl and duplex locking devices brought into action as the wheel ceases its motion, to lock it against advance and retreat and thereby hold the worms stationary; in combining with means whereby the sensitive plates are fed one by one, after exposure, from their appropriate compartment into an exposed-plate compartment, a registering device or dial exhibiting, one by one, the number of plates that have been fed, whereby it may be ascertained whether the compartment is empty or still supplied with plates; in combining with the shutter and the lever-arm by which its operating spool is wound up and with apparatus for feeding plates to exposure and delivering them out of way of a succeeding exposure, a slide operating in one reciprocation the feeding apparatus and in the other the winding-lever; in combining with a rack-plate seated in one wall of the exposed plate compartment and mounted on a vertical shaft, an elbow-lever fixed to the top of said shaft and a slide which positively operates said elbow-lever, first, in one direction to retract the rack within said wall, and, next, in the opposite direction to project the rack; in combining with the lever which winds up the shutter and with the feed apparatus for the sensitive plates and the vertically pivoted rack-plate for the exposed plate compartment and its lever, a slide operating in one movement the winding-lever and retracting the rack, and in the reverse movement the feeding apparatus for the sensitive-plates and projecting the rack to lock the exposed plate just discharged into its compartment; in combining with the rotating shutter and lugs or stops thereon a time-exposure button adapted when moved in one direction to set the shutter for time exposure and when moved in the other direction to release it for instantaneous exposure, and in the various other combinations and details of construction hereinafter described and claimed.

In the drawings, Figure 1 is a vertical longitudinal section through a camera embracing my invention; Fig. 2, a vertical transverse section looking toward the front or shutter end; Fig. 3, a vertical transverse section looking toward the rear; Fig. 4, a top plan view with the cover removed; Fig. 5, a similar view with the parts in a different position; Fig. 6, a plan view, partly in section, of the shutter-actuating pawl and attendant parts; Figs. 7 and 8, views of the exposure pin or button; Fig. 9, a sectional perspective view of the indicator; Figs. 10 and 11, sectional views on the line 10 11 of Fig. 6, and Fig. 12 an edge view of the actuating-slide.

A represents the casing or box of a camera divided into a shutter compartment, B, an exposed-plate compartment, C, and a sensitive-plate or exposure compartment, D, from the latter of which the plates are tipped, one by one, following their exposure, into the exposed-plate compartment, while the succeeding plates are fed up so that the foremost takes the place of the one just tipped out or discharged, in focus for its own exposure. Suitable doors are provided as in my former patent for the insertion of the sensitive plates and for the withdrawal of the exposed plates.

The bottom or flooring of the sensitive plate compartment is grooved and into such grooves are set worms, E, one or more, the threads of which project above the plane of the flooring and are of such distance apart or so pitched that a sensitive plate, $e$, with its holder, $e'$, or that diaphragm or shield which separates it from the succeeding plates, may be received between them parallel with the rear of the chamber and held in close proximity to the succeeding plate received between the next spirals of the threads.

F Figs. 1, 3 and 4 is a gear-wheel intermittently rotated and engaging with pinions, $f$, on the rear ends of the worms in the flooring of the sensitive-plate compartment, and so geared with them that each successive movement through a defined space shall cease at the moment that the extreme end $f'$, of the thread of each worm is partly retracted and yet slightly projected above the delivery edge of the flooring so as to catch and detain the bottom of the plate and form a fulcrum or stop upon which it is tipped.

In the top or cover of the exposure compartment are also formed grooves in which similar worms, G, one or more, are set, having pinions, $g$, at their rear ends which engage with the intermittent driving-wheel that operates the worms in the floor, but in such manner that when said driving-wheel ceases its movement the extreme ends of the worm-threads shall be withdrawn from, or at least flush with, the under surface of the top, thus interposing no obstacle to the free discharge of the plate just exposed.

The intermittent driving-wheel is provided with an equi-distant series of driving-lugs or pins, $g^2$, Figs. 1, 3, 4 and 5, the space between each two being calculated to revolve the worms just sufficiently to move the charge of unexposed or sensitive plates forward a distance corresponding to one plate and its holder, to bring the worms to rest in the position just described. These pins are acted upon successively by a pawl or driving-dog, $g^3$, carried upon a slide, G', Figs. 1, 3, 4 and 5, operated by any suitable means, or as hereinafter described. At the completion of each intermittent movement of the wheel imparted by the action of this slide and driving-pawl, a stop-pawl, G², Fig. 3, snaps behind one of the pins or lugs of the wheel and prevents reverse movement, while a locking-finger, $g^4$, Fig. 3, fixed to the slide, engages with another of said pins to prevent onward movement, thus affording a double or duplex lock which holds the wheel, or the worm with which it gears, rigidly in position and prevents the sensitive plates from accidentally working forward.

Exterior to the casing is mounted a dial, H, Figs. 1 and 9, having suitable numbers, 1, 2, 3, &c., corresponding to the number of plates with which the exposure or sensitive plate compartment is capable of being charged. This dial is set into a groove or recess, $h$, or other appropriate seat, so that it may be turned and held in place frictionally, or otherwise, to properly adjust the numbers to the action of the worms, and over it is placed a disk, H', having a circular opening, $h'$, which is successively brought over one of the figures or numerals with the intermittent movement of the feed-wheel. A binding-screw, H², serves to clamp this disk to the pintle or gudgeon, $h^2$, of the feed-wheel so that it may turn therewith and a brass, $h^3$, supports this pintle and separates it from the casing.

J is an opening for the lens in the front wall of the camera and J', is the shutter by which it is closed or covered. This shutter is pierced with two openings, $j$, and corresponding to these openings has lugs or stops, $j'$. Its pintle, $j^2$, is supported in a bushing, J², which serves to prevent clamping or binding and allows the disk of the shutter more free and easy movement. The bushing in turn is borne in a collar, $j^3$, from the shutter-frame. Mounted loosely upon the brass is a spool or grooved wheel, J⁴, having flanges, J⁵, and connected by a cord, $j^4$, with one end of spring, $j^5$. This spring is coiled about and rocks upon a stud, $k$, from the frame and its heel end $k'$ is received in a socket at one end of a set screw, K, Fig. 2, the other end of which is provided with a square or other suitable head, $k^2$, embraced by a key-button, K', set in the side of the camera-casing, so that by turning this button the tension of the spring may be increased or decreased.

The shutter frame or carrier is provided with a cylindrical sleeve or flange J¹¹ bearing against the inner face of the shutter in opposition to the lens opening through the casing, to guard against the entrance of light.

The hub, L, of the shutter is notched at two points, $l$, equidistant, or at opposite ends of the same diameter, Figs. 10 and 11, to receive the nose of the driving-pawl, L', pivoted in the flange of the spool and also to receive the nose of the back-lash dog, L², pivoted at a fixed point on the frame or casing and by which retrograde movement is prevented. These notches correspond to the position of the shutter when the opening to the lens is closed; that is, the back-lash dog will engage with the notch presented when the shutter comes to rest after an exposure, while the driving-dog, in the reverse movement of the spool to wind up for the next exposure, will engage with the succeeding notch and when the shutter is tipped will carry it around to the position just occupied by the other; that is, for instantaneous exposure.

M is a lever, which may be termed the winding lever, pivoted to a stud, $m$, from the shutter-frame and having at its top an inclined bar, M', and at its opposite end connected by a cord, $m'$, with grooved spool to revolve it reversely to the stress of the spring; that is, in such a direction that it shall wind up the cord leading to the spring whenever the lever is actuated to carry its lower end away from the spool and that the cord leading to the lever will itself be wound up upon the spool whenever the shutter is tripped and rotated by the action of the spool. A stop, $m^2$, limits the movement of the lever toward the spool, while a spring, $m^3$, draws it away therefrom with sufficient force to take up all slack in the connecting cord.

Seated in the side of the casing is a button, N, for instantaneous exposure, the inner end of which is channeled out from the bottom to form walls, $n$, $n'$, and notched laterally as at $n^2$, $n^3$, as shown in Figs. 7 and 8. When the shutter is at rest closing or covering the lens and its spool wound up, one of its stop-lugs, $j'$, rests against the inside of the wall, $n$ of this button in the position represented in Fig. 6, and slightly in advance of the notch, $n^2$, through said wall, but when the button is pressed in it brings this notch or opening into line with the stop-lug and releases the shutter, which thereupon is carried around until the next stop-lug strikes the exterior of wall, $n'$ of the button and is checked. Then, as the shutter-spool is wound up by the action of the winding-lever and the exposure-button is released and drawn back by its spring, $n^5$ the notch, $n^3$, in its wall, $n'$, is brought into line with the pin, which thereupon is carried slightly forward, when the driving-dog engages, to strike the inner face of the wall, $n$, in the position just quitted by the other pin.

P is a button for time exposure. The shank or spindle of this button is slotted as at $p$ to receive a pin, $p'$, which permits it to slide back and forth but prevents it from turning. At its inner end it is provided with a stop-flange, P', so arranged and positioned as to come into the path of one of the stop-lugs on the shutter whenever the button is pulled out, and be struck by it at the time one of the openings in said shutter registers with the lens. Thus by setting this flange and then releasing the shutter by means of the instantaneous button, the stop will be intercepted by this flange and the plate exposed any suitable time, which being ended, the time-exposure button will be pushed in, releasing the stop-lug and shutter to be carried forward until stopped by the other button.

The rear wall of the exposed plate compartment is arranged with a series of downwardly inclined ratchet teeth, Q, so spaced as to be engaged with each successive plate deposited in said compartment, while in the front wall is hinged a ratchet bar, Q', having outsetting, downwardly inclined teeth, $q$, along its free edge, the other edge being secured to and turning with a vertical pivot rod or bar, $Q^2$, the upper end of which is armed with an elbow-lever, $q'$, $q^2$. Mounted in a way, R, centrally, or about centrally, and longitudinally of the top of the cover of the camera box is a slide, R', having at its forward end a pin, $r$, which, whenever this slide is pushed forward by means of the knob, $R^2$, projecting to the exterior of the case, acts upon the inclined head of the winding lever to carry said lever away from its stop and in a direction calculated to wind up the shutter-spool. Rearwardly of this pin the slide is recessed or cut away and at one edge to form a cam-groove, $r'$, into which the arm $q'$ of the elbow-lever at the top of the rod which operates the swinging or hinged rack-plates, alternately takes, while the other arm $q^2$ rides upon the edge, $r^2$. When the slide is pushed forward to its full extent, the rear arm, $q'$, of the lever, is in the cut away track or cam-groove, while the front arm, $q^2$, is upon the edge of the slide, projecting the ratchet-teeth of bar, Q', and when the slide is retracted the rear arm rides upon said edge and the front arm shuts over the end of the slide, withdrawing said teeth.

S is an elbow-lever pivoted to the top of the camera casing, inside thereof, and having one arm, $s$, which is struck alternately by a pin or projection, S', from the slide and by a second projection or ledge, $S^2$, from said slide located at a considerable distance from the first so as to allow an interval of delay in the movements of the lever as it is actuated by the reciprocations of the slide. The second arm, $s'$ of this lever extends to the rear and enters between lugs, $s^2$, from the pawl-bearing slide by which the feed-wheel is actuated so that as the slide is moved to the front to wind up the shutter-spool, the pawl-bearing slide is first allowed to remain stationary and then, as the lever, S is engaged by the projection, $S^2$, is moved back without actuating the feed-wheel and in the rearward reciprocations of the slide R' is, for a corresponding interval, left idle and is then moved forward by the action of the pin, S', on the lever, engaging a driving-pin of the feed-wheel by means of its pawl or driving-dog and turning the wheel a definite distance to revolve the worms, discharge the exposed plate into its compartment and bring the next plate into focus. The rear edge of projection, $S^2$, forms a shoulder, $s^3$, which, when the slide R' is at its extreme rear position, abuts against the upper edge of the front plate of the charge in the exposure compartment and holds the plate, upon which the overhead worms have released their grip, against falling. A spring, S³, seated in a suitable socket in the rear end of the slide R' just behind this shoulder has its forward end so situated in relation to the shoulder that when the slide is moved to the front, withdrawing the spring from over a thick sheathing plate, S⁴, this end will drop behind the upper edge of the plate that has just been exposed and about to be discharged from the exposure compartment and will tip it over into the exposed plate compartment, the lower edge meanwhile being temporarily retained by the extreme ends of the threads of the worms in the bottom of the chamber or compartment.

In operation, supposing the camera to be empty and the slide R' drawn back to the extreme of its rearward movement, a charge of sensitive plates is introduced into the magazine or exposure compartment, as in my former patent. If this charge is commensurate with the full capacity of the feed-apparatus, the front plate or that which is to be first exposed, will be embraced by the threads at the extreme forward ends of the worms above and beneath; that is, above it will have but a single thread in advance of it and beneath it will have a single full thread and a portion of the extreme end of the next thread, or, as it may be termed, a thread and a half, or even two threads. The slide R' is then moved forward, operating the winding lever by contact with its oblique head and at the same time throwing out the ratchet-bar, ineffectively, however, as at that moment there will be no exposed plates in the exposure compartment. Now, the slide R' is again moved to the rear, revolving the feed-wheel sufficiently to give a single full rotation to each of the worms, thus advancing the entire charge of sensitive plates one step, carrying the lower edge of the front plate forward so that but a single thread is in front of its lower edge, while the threads of worms overhead are withdrawn from the front of the upper edge of the plate and push against its rear edge to carry it against the stop-shoulder on the slide R' and in advance of the end of the plate-spring carried by said slide. The exposure is now made, the slide R' moved forward, tipping the plate just exposed into the compartment beneath, throwing the latch-bar out to lock over it, and actuating the winding lever. Then the slide is again moved to the rear and another plate brought into focus to be exposed and discharged into the proper compartment by a repetition of the motions of the slide R' as just described.

I do not intend to limit myself to the specific mechanism herein described for actuating the feed-worms, nor to the employment of a definite number of worms, as it is obvious that only a sufficient number may be used to preserve the parallelism of the plates; for instance, two in the flooring and a single worm arranged centrally above, or vice versa; nor do I limit myself to their location to the top and bottom, as they may be arranged in the sides of the compartment, or certain of them in the top or bottom and certain on one or both sides; nor do I limit myself to bringing the lower worms of the feed apparatus to rest with the extreme ends of their threads projecting above the edge of the front plate of the charge in the magazine or exposure compartment to serve as stops or fulcrums for the plate to tip upon, as it will be obvious that a fixed stop or lip such as shown in my former patent may be employed and the worm-threads feed the plate against such stop and withdraw entirely from in advance of the plate, as is the case with the over-head worms which feed against the stop upon the cam-slide; nor do I limit myself to giving a full revolution to the worms for each feeding operation, since by cutting them with double or triple threads and decreasing the thickness of the sensitive plates or films, a half or a third of a revolution will be sufficient for feed and discharge; but What I do claim is—

1. The combination in a camera provided with a magazine or compartment to receive a charge of sensitive plates; of worms arranged in the walls of the said compartment and having their threads arranged to embrace the edges of the plates of the charge; and means for intermittently rotating said worms to feed the charge of plates forward positively the space of a single plate and for arresting the movement of the worms after the charge has been fed forward the predetermined distance.

2. The combination in a camera provided with a magazine or compartment to receive a charge of sensitive plates; of worms arranged in the walls of the said compartment and having their threads arranged to embrace the edges of the plates of the charge; means for intermittently rotating said worms to feed the charge of plates forward positively the space of a single plate; and a stop to assist in holding the foremost plate in the focal plane.

3. The combination, substantially as hereinbefore set forth, in a camera, with the magazine or exposure compartment and exposed plate compartment, of worms arranged in the upper and lower walls of the exposure compartment with their threads adapted to embrace the edges of the plates to be exposed, means for intermittently imparting a full revolution to said worms and bringing them to rest with the forward thread of the lower worm or worms projecting above the surface of the flooring in advance of the lower edge of the plate to be exposed and the extreme end of the thread of the upper worm or worms withdrawn from in advance of the upper edge of said plate.

4. The combination, substantially as hereinbefore set forth, in a camera, with the exposure compartment, of feed-worms located in the top and bottom thereof, pinions on the rear ends of said feed-worms, a gear-wheel engaging with said pinions and intermittently operated to impart a single full revolution to each of said worms, a slide and intermediate mechanism whereby said gear-wheel is operated, a stop on said slide against which the upper edge of the front plate is brought by the revolution of the overhead worm or worms, and a spring on said slide whereby in its forward movement the upper edge of the plate is engaged and tipped into a receptacle beneath.

5. The combination, substantially as hereinbefore set forth, in a camera, of the feed-worms and their pinions, the gear-wheel, the pawl-slide, the elbow-lever connected with said pawl-slide and the slide R' having projections between which one arm of the elbow-lever is received whereby the feed-wheel is operated and allowed intervals of delay in the back and forth movement of the slide R'.

6. The combination, substantially as hereinbefore set forth, of the feed-worms, and their pinions, the feed-wheel engaging with said pinions, the driving pawl, by which said feed wheel is intermittently operated and a duplex lock engaging with said wheel when it comes to rest to prevent either onward or retrograde movement.

7. The combination, substantially as hereinbefore set forth, of the feed-worms and their pinions, the feed-wheel, and driving-pawl and its slide, the locking-pawl engaging with said feed-wheel to prevent reverse movement, and an arm on the slide which carries the driving-pawl also engaging with said feed-wheel at the end of the engagement of the driving-pawl, to prevent forward movement.

8. The combination, substantially as hereinbefore set forth, with the feed-worms and their driving-wheel, of the registering dial and an indicator carried by the stud-axle of the drive wheel to expose or point out the number of times it has been actuated and thereby the number of plates which have been fed from the magazine.

9. The combination, substantially as hereinbefore set forth, with the exposure chamber or magazine and with feed apparatus for carrying forward the charge of sensitive plates, of the indicator external to the case and operated by the feed-driving gear, and a registering dial to be turned upon its axis whereby said dial may be set to cause the indicator to properly register the number of plates in the magazine whenever a charge of less than its full capacity is inserted.

10. The combination, substantially as hereinbefore set forth, with the shutter and the winding apparatus by which it is driven and with the feed-devices for carrying forward the sensitive plates in the exposure compartment, of a slide operating in one reciprocation said feed-devices and in the reverse reciprocation the winding apparatus for the shutter.

11. The combination, substantially as hereinbefore set forth, with the shutter and its operating spool, and with feed-apparatus whereby the charge of sensitive plates is fed from the magazine, of the winding-lever having an oblique head, and a slide operating in one reciprocation the feeding apparatus and in the reverse reciprocation bearing upon said head to operate the winding lever and spool.

12. The combination, substantially as hereinbefore set forth, of the rack-plate seated in one wall of the exposed plate compartment and mounted on a vertical shaft, of a lever seated at the top of said shaft and a slide positively operating said lever, first in one direction to retract the rack and next in the opposite direction to project the rack.

13. The combination, substantially as hereinbefore set forth, with the lever which winds up the shutter and with feed-apparatus for the sensitive plates and the vertically pivoted rack-plate for the exposed plate compartment, and its operating lever, of the slide operating in one movement the winding lever and retracting the rack and in the reverse movement operating the feed-apparatus for the sensitive plates and projecting the rack.

14. The combination, substantially as hereinbefore set forth, of the shutter and its stop-lugs, of the reciprocating time exposure button having a stop-flange on its upper end arranged so that when the button is moved in one direction said flange is brought into the path of a lug or pin on said shutter to stop said shutter when the opening therethrough registers with the lens and when it is moved in the reverse direction the lug is released and the shutter allowed to move on to cut off the lens.

15. The combination, substantially as hereinbefore set forth, with the shutter and its winding spool and with stop-lugs on said shutter, of the instantaneous exposure button having its inner end channeled out and notched or recessed, as described.

16. In combination with the shutter, its spool, spring, and winding lever; the notched collar L; the pawl L' carried by the spool; and the fixed pawl L²,—both of said pawls engaging the collar.

17. The combination, substantially as hereinbefore set forth, with the shutter, of a cylindrical sleeve or flange J¹¹ arranged close to its inner face in opposition to the lens opening through the casing, to guard against light entering the interior of the camera.

CHAS. B. WITHINGTON.

Witnesses:
A. S. WELLS,
ALBERT H. BATES.